(12) United States Patent
Givoly (10) Patent No.: US 8,438,412 B1
(45) Date of Patent: May 7, 2013

(54) SYSTEM, METHOD, AND COMPUTER PROGRAM FOR ENABLING AN AMOUNT OF MULTITASKING FOR USE BY AN OPERATING SYSTEM

(75) Inventor: Tal Givoly, Irvine, CA (US)

(73) Assignee: Amdocs Software Systems Limited, Dublin (IE)

(*) Notice: Subject to any disclaimer, the term of this patent is extended or adjusted under 35 U.S.C. 154(b) by 324 days.

(21) Appl. No.: 12/887,462

(22) Filed: Sep. 21, 2010

(51) Int. Cl.
*G06F 1/00* (2006.01)

(52) U.S. Cl.
USPC ............ 713/340; 713/300; 713/310; 713/320

(58) Field of Classification Search .................. 713/300, 713/310, 320, 340
See application file for complete search history.

(56) References Cited

U.S. PATENT DOCUMENTS

| | | | |
|---|---|---|---|
| 5,892,971 A | 4/1999 | Danielson et al. | |
| 6,498,460 B1 | 12/2002 | Atkinson | |
| 7,573,159 B1* | 8/2009 | DeIuliis et al. | 307/150 |
| 7,581,130 B2* | 8/2009 | Carroll et al. | 713/340 |
| 7,583,951 B2* | 9/2009 | Gibbs | 455/343.5 |
| 7,692,403 B2* | 4/2010 | Chuang et al. | 320/111 |
| 8,228,043 B2* | 7/2012 | Wolf et al. | 320/162 |
| 2006/0277420 A1* | 12/2006 | Nguyen | 713/300 |
| 2008/0113691 A1* | 5/2008 | Otsuki | 455/573 |
| 2010/0235659 A1* | 9/2010 | Sawyers et al. | 713/320 |
| 2011/0208980 A1* | 8/2011 | Brooks et al. | 713/300 |

* cited by examiner

*Primary Examiner* — Kim Huynh
*Assistant Examiner* — Zahid Choudhury
(74) *Attorney, Agent, or Firm* — Zilka-Kotab, PC (57) ABSTRACT

A system, method, and computer program product are provided for enabling an amount of multitasking for use by an operating system. In use, an amount of power being delivered to a device is identified. Additionally, it is determined whether the amount of power is sufficient to charge a power store of the device. Further, an amount of multitasking for use by an operating system of the device may be enabled based on the determination. Still yet, the amount of multitasking enabled for use by the operating system of the device is based on the determination such that a first amount of multitasking is enabled for use by the operating system of the device if it is determined that the amount of power is sufficient to charge the power store of the device, and a second amount of multitasking less than the first amount is enabled for use by the operating system of the device if it is determined that the amount of power is insufficient to charge the power store of the device.

19 Claims, 5 Drawing Sheets

SYSTEM, METHOD, AND COMPUTER PROGRAM FOR ENABLING AN AMOUNT OF MULTITASKING FOR USE BY AN OPERATING SYSTEM

FIELD OF THE INVENTION

The present invention relates to power usage, and more particularly to optimizing power consumption of a device.

BACKGROUND

Traditionally, an amount of power that a portable device uses during operation has been of great importance. For example, the amount of power used by the portable device during operation may directly relate to an amount of time that a portable device may be run while utilizing a power store of the device. Unfortunately, conventional power management systems have exhibited various limitations in the manner in which the amount of power used by a portable device during operation is regulated. For example, conventional power management systems may restrict processing capabilities of portable devices without considering a current power configuration of the device.

There is thus a need for addressing these and/or other issues associated with the prior art.

SUMMARY

A system, method, and computer program product are provided for enabling an amount of multitasking for use by an operating system. In use, an amount of power being delivered to a device is identified. Additionally, it is determined whether the amount of power is sufficient to charge a power store of the device. Further, an amount of multitasking for use by an operating system of the device may be enabled based on the determination. Still yet, the amount of multitasking enabled for use by the operating system of the device is based on the determination such that a first amount of multitasking is enabled for use by the operating system of the device if it is determined that the amount of power is sufficient to charge the power store of the device, and a second amount of multitasking less than the first amount is enabled for use by the operating system of the device if it is determined that the amount of power is insufficient to charge the power store of the device.

DETAILED DESCRIPTION

Figure 1:
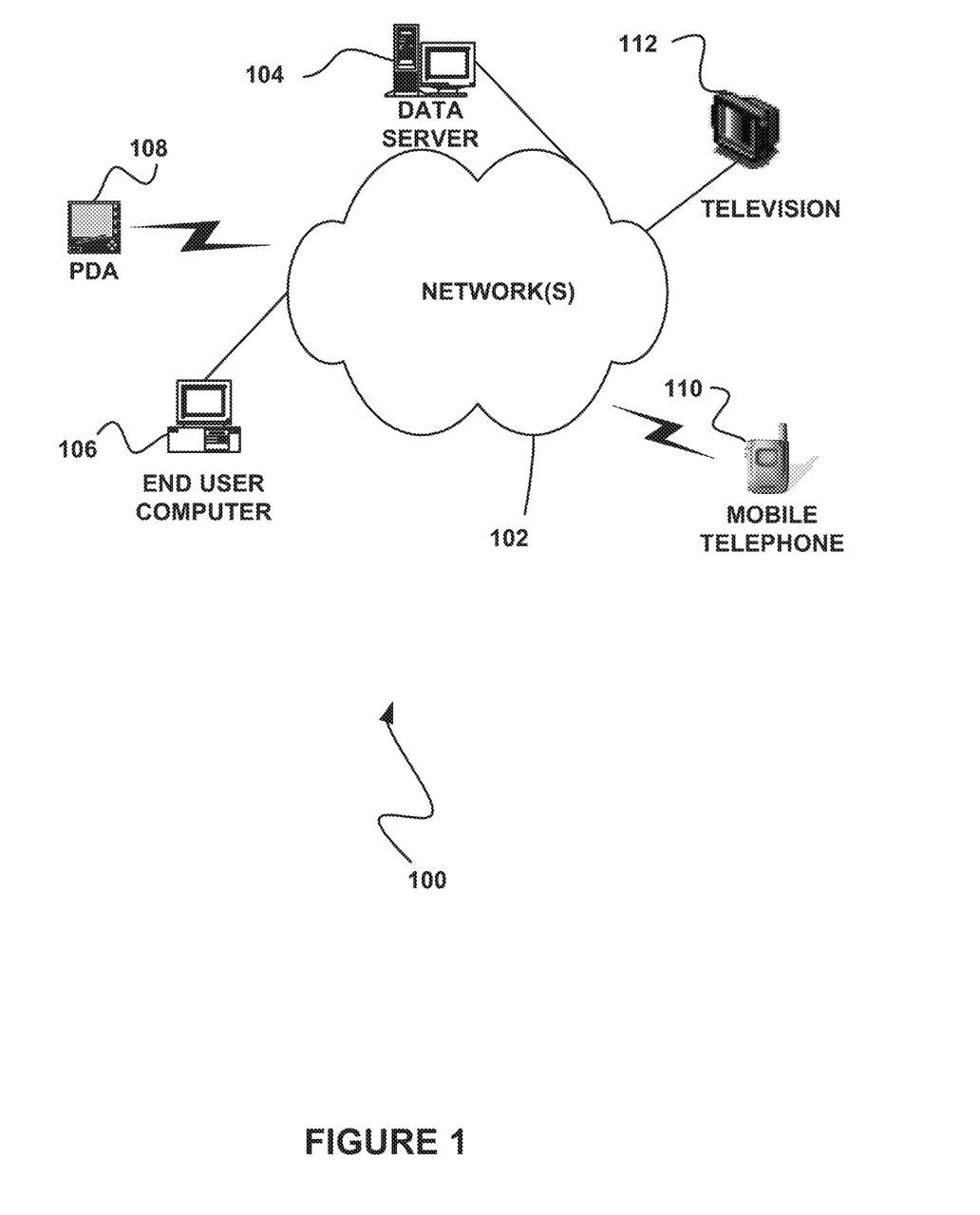
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
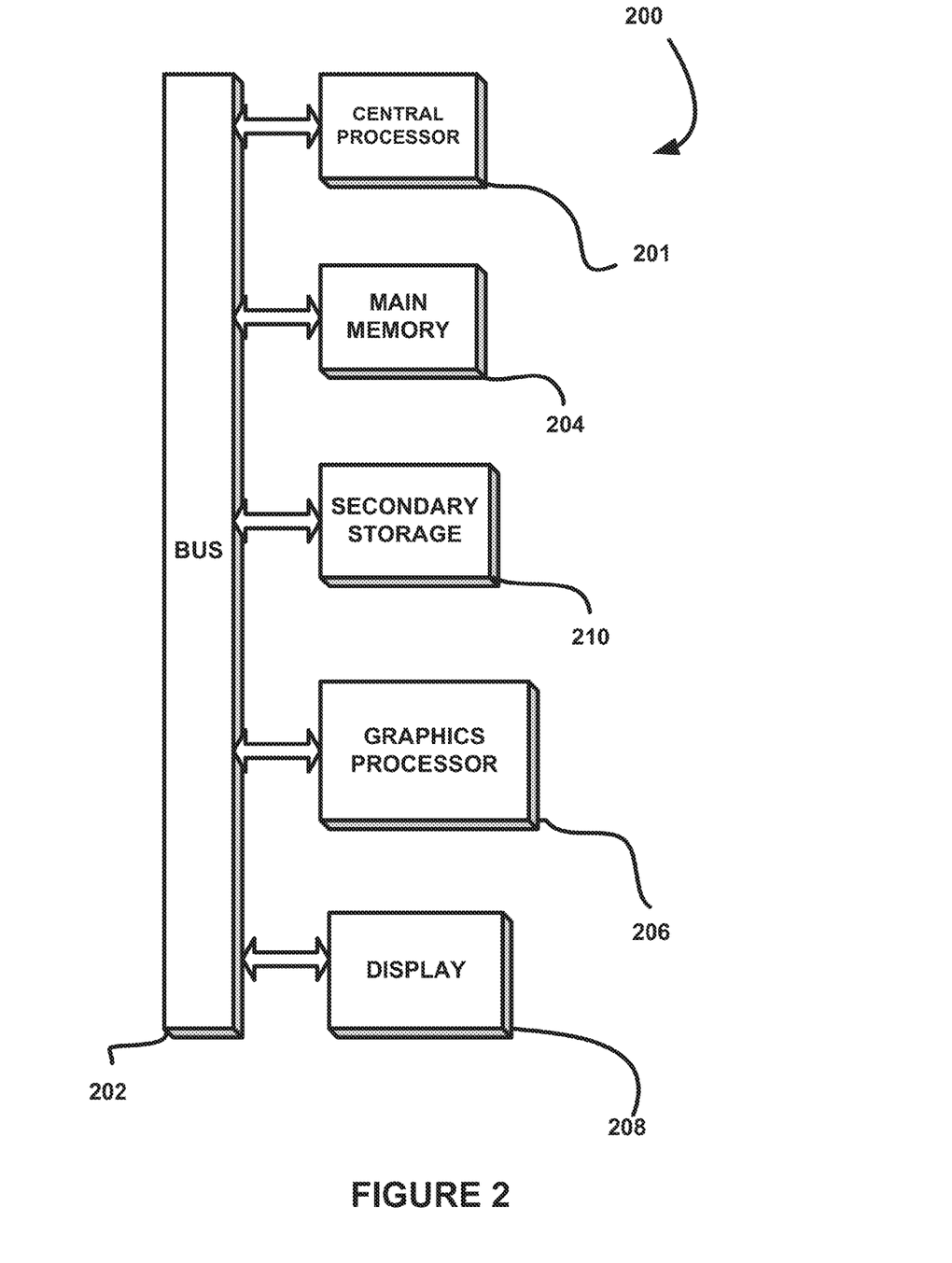
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
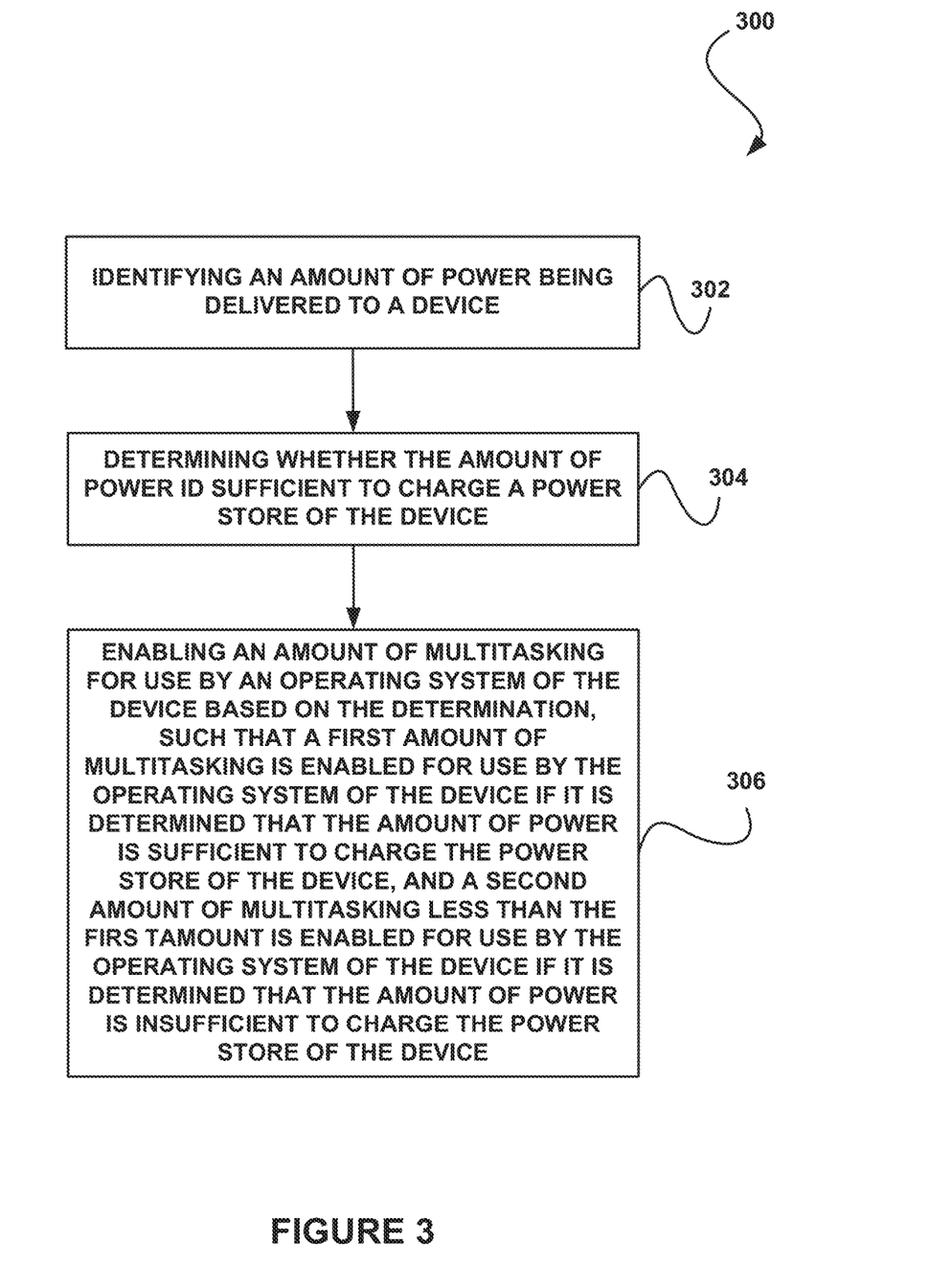
FIG. 3 illustrates a method for enabling an amount of multitasking for use by an operating system, in accordance with one embodiment.

FIG. 3 illustrates a method 300 for enabling an amount of multitasking for use by an operating system, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, an amount of power being delivered to a device is identified. In the context of the present embodiment, the device may include any product capable of receiving power for operation. In one embodiment, the device may include a portable device. For example, the device may include a laptop computer, a personal digital assistant (PDA), a handheld computer (e.g., an iPad®, tablet computer, etc.), a cellular telephone (e.g., an iPhone®, Blackberry®, etc.), etc.

Additionally, the power being delivered to the device may originate from one or more of a variety of sources. For example, the power being delivered to the device may originate from an electrical outlet, a solar energy source (e.g., a solar panel, etc.), a battery (e.g., a car battery, etc.), a universal serial bus (USB) power source, a wireless power source, or any other power source. Also, in one embodiment, the amount of power being delivered to the device may be identified using any measurement. For example, the amount of power being delivered to the device may be identified in amperes (A). Further, in another embodiment, the power store of the device may be charged by a simple charger, a trickle charger, a timer-based charger, an intelligent charger, a fast charger, a pulse charger, an inductive charger, etc.

Furthermore, the amount of power being delivered to the device may be identified by monitoring one or more components of the device. For example, one or more power inputs of the device may be monitored. In another embodiment, one or more power stores of the device may be monitored. Of course, however, any component of the device may be monitored in order to identify the amount of power being delivered to the device. Also, this monitoring may be performed by a particular operational mode of the device. For example, an operational mode of an operating system of the device may monitor a power inlet of the device (e.g., a power receptacle, etc.) in order to identify how much power is entering the device via that inlet. In another example, the operational mode of the operating system of the device may monitor a power store of the device in order to identify how much power is being fed to the power store of the device.

In another embodiment, the operational mode of the device may be selected by a user. For example, the operational mode of the device may be selected by the user when the device first powers on, while the device is running, when a firmware interface of the device is accessed, etc. In still another embodiment, the operational mode of the device may be selected from a plurality of operational modes of the device.

Further still, in one embodiment, the amount of power being delivered to the device may be monitored when the device is turned on. In another embodiment, the amount of power being delivered to the device may be monitored during the time the device is active. In yet another embodiment, the amount of power being delivered to the device may be monitored on a periodic basis, in response to a user command, in response to a predetermined schedule (e.g., a default schedule, a schedule set by the user, etc.), or in any other manner.

In addition, as shown in operation 304, it is determined whether the amount of power is sufficient to charge a power store of the device. In the context of the present embodiment, the power store may include any means for storing power associated with the device for use by the device. For example, the power store may include a battery of the device (e.g., a removable battery of the device, a non-removable battery of the device, etc.), a capacitor installed in the device, etc. In another example, the power store may be internal to the device, external to the device, etc.

In one embodiment, the amount of power may be compared to a threshold amount in order to determine whether the amount of power is sufficient to charge a power store of the device. For example, the threshold amount may indicate the lowest amount of power necessary to be delivered to the device in order to charge the power store of the device. In one embodiment, the threshold amount may be predetermined, dynamically determined, user-configurable, etc. In another embodiment, the threshold may be associated with a particular rate of charge for the power store of the device. For example, the threshold may indicate an amount of power sufficient to trickle charge the power store of the device, an amount of power sufficient to fast charge the power store of the device, etc.

Further, as shown in operation 306, an amount of multitasking for use by an operating system of the device is enabled based on the determination. Additionally, the amount of multitasking enabled for use by the operating system of the device is based on the determination such that a first amount of multitasking is enabled for use by the operating system of the device if it is determined that the amount of power is sufficient to charge the power store of the device, and a second amount of multitasking less than the first amount is enabled for use by the operating system of the device if it is determined that the amount of power is insufficient to charge the power store of the device.

In one embodiment, the amount of multitasking for use by the operating system of the device may include a number of applications that are allowed to be run simultaneously utilizing the operating system of the device. For example, if it is determined that the amount of power is sufficient to charge the power store of the device, a first predetermined number of applications may be allowed to be run simultaneously utilizing the operating system of the device. For example, the predetermined number of applications may include any number of applications from two applications to an unlimited number of applications.

Additionally, if it is determined that the amount of power is insufficient to charge the power store of the device, a second predetermined number of applications fewer than the first predetermined number may be allowed to be run simultaneously utilizing the operating system of the device. For example, only a single application may be allowed to be run at one time utilizing the operating system of the device.

In another embodiment, the amount of multitasking for use by the operating system of the device may include a number of resources of the device that are allowed to be used by one or more applications running in the operating system of the device. In one embodiment, the resources of the device may include any element of the device that is accessible by an application running on the device. For example, the resources of the device may include an audio element of the device, a positioning element of the device (e.g., a global positioning system (GPS) element), a sensor element of the device (e.g., a gyroscopic element, an accelerometer element, etc.), a communications element of the device (e.g., a wireless network connection, a wired connection, a cellular connection, etc.), a computation element of the device, etc.

For example, if it is determined that the amount of power is sufficient to charge the power store of the device, each of a plurality of applications may be allowed to be run simultaneously utilizing the operating system of the device, and all running applications may be allowed to access one or more resources of the device. Additionally, if it is determined that the amount of power is insufficient to charge the power store of the device, each of a plurality of applications may be allowed to be run simultaneously utilizing the operating system of the device, but all running applications may be allowed to access resources of the device based on the status of each application.

In one embodiment, if it is determined that the amount of power is insufficient to charge the power store of the device, an application that is determined to be an active application (e.g., an application currently being interacted with by a user of the device, an application running in the foreground of the device, etc.) may be allowed to access one or more resources of the device. However, if it is determined that the amount of power is insufficient to charge the power store of the device, an application that is determined to be a passive application (e.g., an application running in a background of the device, an application not currently being interacted with by the user of the device, etc.) may be allowed to access limited resources of the device.

For example, the application that is determined to be a passive application may only access a limited number of resources of the device (e.g., one resource, two resources, three resources, etc.). In another example, the application that is determined to be a passive application may only access a subset of resources of the device (e.g., only an audio element, only a positioning element, etc.). In yet another example, the application that is determined to be a passive application may be forced to become inactive. For example, the application that is determined to be a passive application may be placed in a sleep mode and may exit such sleep mode upon receiving one or more notifications.

In this way, performance and functionality of the operating system of the device, as well as an amount of power in the power store of the device, may be optimized based on the amount of power being delivered to the device. For example, by enabling a second amount of multitasking less than the first amount for use by the operating system if it is determined that the amount of power being delivered to the device is insufficient to charge the power store of the device, the operating system may use less power than if the first amount of multitasking was enabled, which may result in a longer period of use of the device via the power store of the device.

In another example, by enabling a first amount of multitasking greater than the second amount for use by the operating system if it is determined that the amount of power being delivered to the device is sufficient to charge the power store of the device, the operating system may provide a greater amount of functionality than if the second amount of multitasking was enabled, which may result in an increase in the performance of the device without affecting the period of use of the device via the power store of the device.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
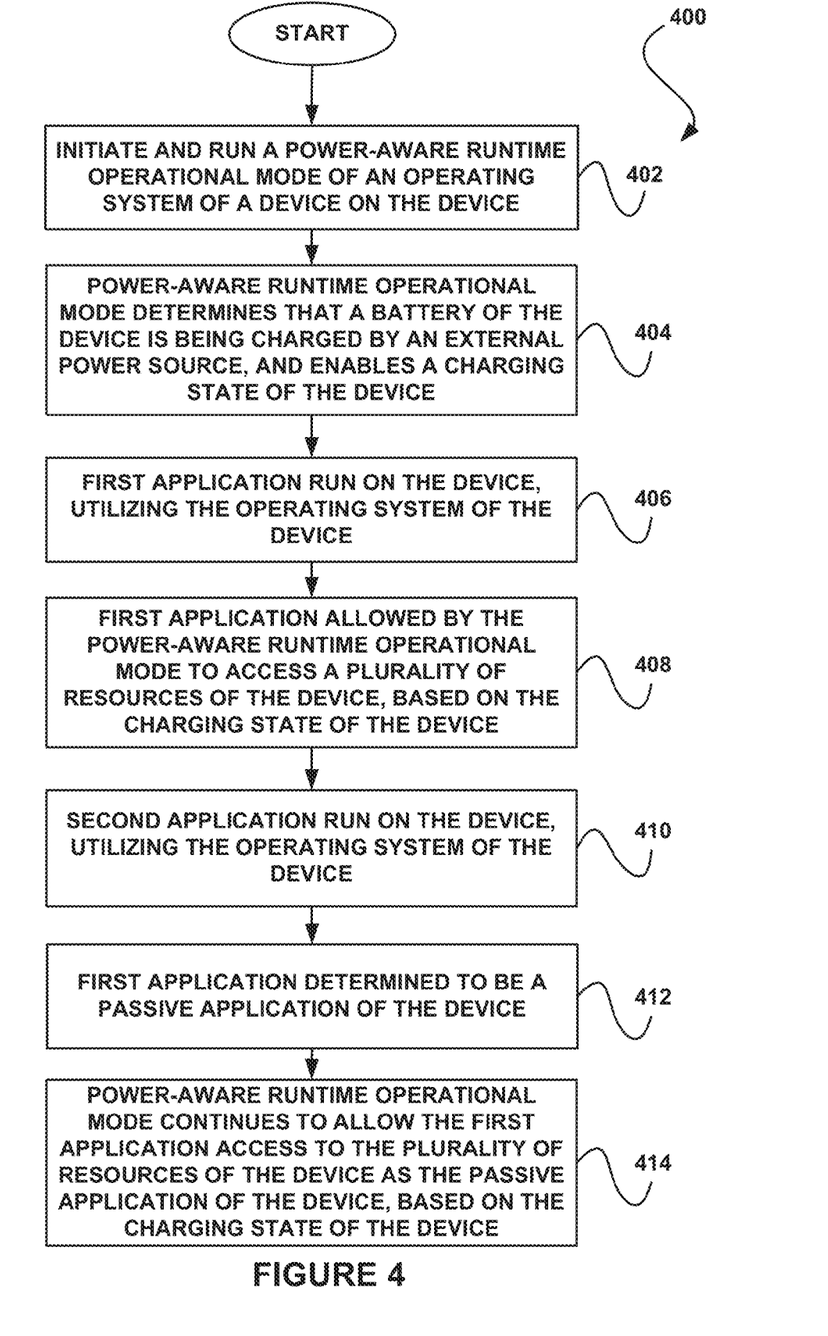
FIG. 4 illustrates a method for enabling full multitasking support for a device being charged by an external power source, in accordance with another embodiment.

FIG. 4 illustrates a method 400 for enabling full multitasking support for a device being charged by an external power source, in accordance with another embodiment. As an option, the method 400 may be implemented in the context of the details of FIGS. 1-3. Of course, however, the method 400 may be implemented in any desired environment. Further, the aforementioned definitions may equally apply to the description below.

As shown in operation 402, a power-aware runtime operational mode of an operating system of a device is initiated and run on the device. In one embodiment, the power-aware runtime operational mode may be selected by a user of the device to be initiated and run on the device. For example, the user may select the power-aware runtime operational mode from a list of a plurality of operational modes of the operating system of the device.

Additionally, as shown in decision 404, the power-aware runtime operational mode determines that a battery of the device is being charged by an external power source, and enables a charging state of the device. For example, the power-aware runtime operational mode may determine that the device is connected to an electrical outlet (e.g., via a power cable, etc.), and that the electrical outlet is providing sufficient power to the device to charge the battery of the device. Additionally, in one embodiment, the charging state of the device may include a state of the device that indicates to the power-aware runtime operational mode and any other elements of the device that the device is currently being charged by an external power source.

Further still, as shown in operation 406, a first application is run on the device, utilizing the operating system of the device. For example, the first application may be selected from a plurality of available applications on the device by the user using a graphical user interface (GUI) of the device. In one embodiment, the first application may run in the foreground of the device and may be considered an active application of the device.

Additionally, as shown in operation 408, the first application is allowed by the power-aware runtime operational mode to access a plurality of resources of the device, based on the charging state of the device. For example, the first application may be allowed to access all resources of the device required by the first application to operate properly.

Further, as shown in operation 410, a second application is run on the device, utilizing the operating system of the device. For example, the second application may be selected from the plurality of available applications on the device by the user using the graphical user interface (GUI) of the device. In one embodiment, the second application may run in the foreground of the device and may be considered the active application of the device.

Further still, as shown in operation 412, the first application is determined to be a passive application of the device. In one embodiment, the first application may be determined to be a passive application of the device when the second application is identified as the active application of the device. Also, as shown in operation 414, the power-aware runtime operational mode continues to allow the first application access to the plurality of resources of the device as the passive application of the device, based on the charging state of the device.

In one embodiment, the power-aware runtime operational mode may periodically confirm that the battery of the device is being charged by the external power source. For example, the power-aware runtime operational mode may confirm that the battery of the device is being charged by the external power source on a predetermined time period, according to a predetermined schedule, etc. In one embodiment, if the power-aware runtime operational mode confirms that the battery of the device is no longer being charged by the external power source, the state of the device may be changed from the charging state to a non-charging state.

In another embodiment, a time delay (e.g., one second, five seconds, thirty seconds, etc.) may occur before switching the state of the device. For example, the power-aware runtime operational mode may switch the device from a charging state to a non-charging state (or from a non-charging state to a charging state) after a time delay has passed in order to avoid hysteresis.

In this way, full multitasking support may be enabled for use by the operating system when the battery of the device is being charged by an external power source by allowing all applications running on the device to access all necessary resources of the device, regardless of the status of each application running on the device (e.g., whether the application is active, passive, etc.), thereby optimizing the performance of the device when the battery of the device is being charged by an external power source.

Figure 5:
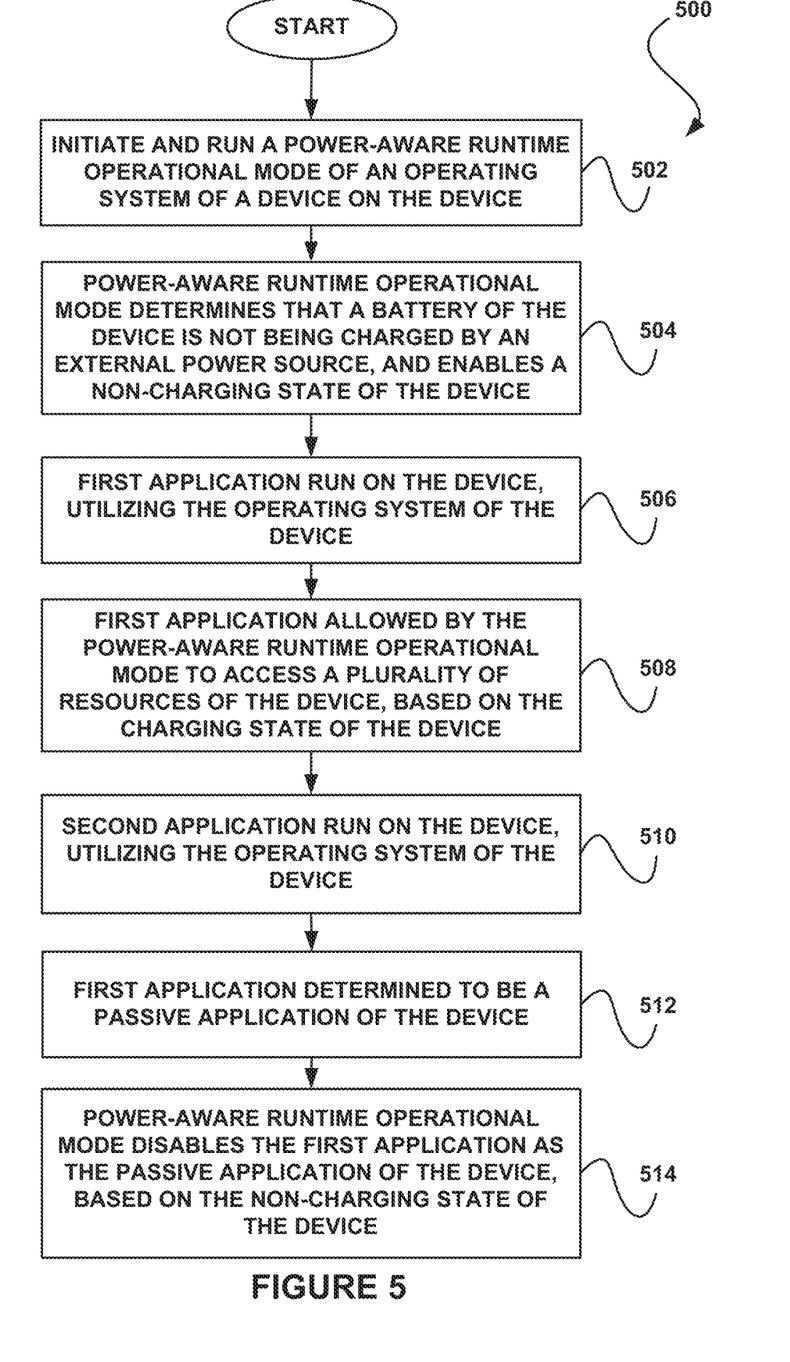
FIG. 5 illustrates a method for enabling partial multitasking support for a device not being charged by an external power source, in accordance with yet another embodiment.

FIG. 5 illustrates a method 500 for enabling partial multitasking support for a device not being charged by an external power source, in accordance with another embodiment. As an option, the method 500 may be implemented in the context of the details of FIGS. 1-4. Of course, however, the method 500 may be implemented in any desired environment. Further, the aforementioned definitions may equally apply to the description below.

As shown in operation 502, a power-aware runtime operational mode of an operating system of a device is initiated and run on the device. Additionally, as shown in decision 504, the power-aware runtime operational mode determines that a battery of the device is not being charged by an external power source, and enables a non-charging state of the device. For example, the power-aware runtime operational mode may determine that the device is not connected to an electrical outlet, and that the power to the device is being provided by the battery of the device. In another example, the power-aware runtime operational mode may determine that the device is connected to the electrical outlet, but that the power provided to the device from the electrical outlet is insufficient to charge the battery of the device. Additionally, in one embodiment, the non-charging state of the device may include a state of the device that indicates to the power-aware runtime operational mode and any other elements of the device that the device is not currently being charged by an external power source.

Further still, as shown in operation 506, a first application is run on the device, utilizing the operating system of the device. Additionally, as shown in operation 508, the first application is allowed by the power-aware runtime operational mode to access a plurality of resources of the device, based on the non-charging state of the device. Further, as shown in operation 510, a second application is run on the device, utilizing the operating system of the device. Further still, as shown in operation 512, the first application is determined to be a passive application of the device.

Also, as shown in operation 514, the power-aware runtime operational mode disables the first application as the passive application of the device, based on the non-charging state of the device. In one embodiment, the disabling of the first application may include limiting the access of the first application to the plurality of resources of the device. For example, the power-aware runtime operational mode may place the first application in a "sleep" mode. In another example, the power-aware runtime operational mode may not allow the first application to access any of the plurality of resources of the device. In yet another example, the power-aware runtime operational mode may allow the first application access to a subset of the plurality of resources of the device.

In another embodiment, the first application may remain disabled until the first application receives a notification. In one embodiment, the notification may include an indication that the first application is an active application. For example, the first application may remain disabled until the user of the device interacts with the first application (e.g., selects the first application utilizing a GUI, etc.). Additionally, if the first application receives the notification, the first application may then become the active application and may be allowed by the power-aware runtime operational mode to access the plurality of resources of the device.

In still another embodiment, the power-aware runtime operational mode may periodically confirm that the battery of the device is not being charged by any external power source. For example, the power-aware runtime operational mode may confirm that the battery of the device is not being charged on a predetermined time period, according to a predetermined schedule, etc. In one embodiment, if the power-aware runtime operational mode confirms that the battery of the device is currently being charged by the external power source, the state of the device may be changed from a non-charging state to a charging state.

In this way, limited multitasking support may be enabled for use by the operating system when the battery of the device is not being charged by an external power source by allowing access to resources of the device based on the status of each application running on the device (e.g., whether the application is active, passive, etc.), thereby lowering the power consumption of the device and maximizing the run time of the device on the battery of the device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for identifying an amount of power being delivered to a device;
   computer code for determining whether the amount of power is sufficient to charge a power store of the device; and
   computer code for enabling an amount of multitasking for use by an operating system of the device based on the determination, wherein the amount of multitasking for use by the operating system of the device includes a number of applications that are allowed to be run simultaneously utilizing the operating system of the device;
   wherein the amount of multitasking enabled for use by the operating system of the device is based on the determination such that a first amount of multitasking is enabled for use by the operating system of the device if it is determined that the amount of power is sufficient to charge the power store of the device, and a second amount of multitasking less than the first amount is enabled for use by the operating system of the device if it is determined that the amount of power is insufficient to charge the power store of the device;
   wherein the computer program is operable such that if it is determined that the amount of power is sufficient to charge the power store of the device, each of a plurality of applications are allowed to be run simultaneously utilizing the operating system of the device, and all running applications are allowed to access one or more resources of the device;
   wherein the computer program is operable such that if it is determined that the amount of power is insufficient to charge the power store of the device, each of the plurality of applications are allowed to be run simultaneously utilizing the operating system of the device, and all running applications are allowed to access the resources of the device based on a status of each application.

2. The computer program of claim 1, wherein the device is a portable device.

3. The computer program of claim 1, wherein the amount of power being delivered to the device is identified by monitoring one or more components of the device.

4. The computer program of claim 3, wherein the monitoring is performed by a particular operational mode of the device.

5. The computer program of claim 4, wherein the computer program is operable such that the operational mode of the device is selected by a user.

6. The computer program of claim 1, wherein the power store includes a battery of the device.

7. The computer program of claim 1, wherein the amount of power is compared to a threshold amount in order to determine whether the amount of power is sufficient to charge a power store of the device.

8. The computer program of claim 7, wherein the computer program is operable such that the threshold amount indicates a lowest amount of power necessary to be delivered to the device in order to charge the power store of the device.

9. The computer program of claim 1, wherein the amount of multitasking for use by the operating system of the device further includes a number of the resources of the device that are allowed to be used by one or more of the applications running in the operating system of the device.

10. The computer program of claim 1, wherein the computer program is operable such that if it is determined that the amount of power is insufficient to charge the power store of the device, an application that is determined to be an active application is allowed to access one or more resources of the device.

11. The computer program of claim 1, wherein the computer program is operable such that if it is determined that the amount of power is insufficient to charge the power store of the device, an application that is determined to be a passive application is allowed to access limited resources of the device.

12. The computer program of claim 11, wherein the computer program is operable such that the application that is determined to be the passive application can only access a limited number of resources of the device.

13. The computer program of claim 11, wherein the computer program is operable such that the application that is determined to be the passive application can only access a subset of resources of the device.

14. The computer program of claim 11, wherein the computer program is operable such that the application that is determined to be a passive application is forced to become inactive.

15. The computer program of claim 11, wherein the application is determined to be the passive application if the application runs in a background of the device or is not currently being interacted with by a user of the device.

16. The computer program of claim 1, wherein the number of applications is between two applications and an unlimited number of applications.

17. A method, comprising:
identifying an amount of power being delivered to a device;
determining whether the amount of power is sufficient to charge a power store of the device; and
enabling an amount of multitasking for use by an operating system of the device based on the determination, wherein the amount of multitasking for use by the operating system of the device includes a number of applications that are allowed to be run simultaneously utilizing the operating system of the device;
wherein the amount of multitasking enabled for use by the operating system of the device is based on the determination such that a first amount of multitasking is enabled for use by the operating system of the device if it is determined that the amount of power is sufficient to charge the power store of the device, and a second amount of multitasking less than the first amount is enabled for use by the operating system of the device if it is determined that the amount of power is insufficient to charge the power store of the device;
wherein if it is determined that the amount of power is sufficient to charge the power store of the device, each of a plurality of applications are allowed to be run simultaneously utilizing the operating system of the device, and all running applications are allowed to access one or more resources of the device;
wherein if it is determined that the amount of power is insufficient to charge the power store of the device, each of the plurality of applications are allowed to be run simultaneously utilizing the operating system of the device, and all running applications are allowed to access the resources of the device based on a status of each application.

18. A system, comprising:
a processor for:
identifying an amount of power being delivered to a device;
determining whether the amount of power is sufficient to charge a power store of the device; and
enabling an amount of multitasking for use by an operating system of the device based on the determination, wherein the amount of multitasking for use by the operating system of the device includes a number of applications that are allowed to be run simultaneously utilizing the operating system of the device;
wherein the amount of multitasking enabled for use by the operating system of the device is based on the determination such that a first amount of multitasking is enabled for use by the operating system of the device if it is determined that the amount of power is sufficient to charge the power store of the device, and a second amount of multitasking less than the first amount is enabled for use by the operating system of the device if it is determined that the amount of power is insufficient to charge the power store of the device;
wherein the system is operable such that if it is determined that the amount of power is sufficient to charge the power store of the device, each of a plurality of applications are allowed to be run simultaneously utilizing the operating system of the device, and all running applications are allowed to access one or more resources of the device;
wherein the system is operable such that if it is determined that the amount of power is insufficient to charge the power store of the device, each of the plurality of applications are allowed to be run simultaneously utilizing the operating system of the device, and all running applications are allowed to access the resources of the device based on a status of each application.

19. The system of claim 18, wherein the processor is coupled to memory via a bus.

* * * * *